(12) United States Patent
Loos et al.

(10) Patent No.: US 11,279,404 B2
(45) Date of Patent: Mar. 22, 2022

(54) STEERING DEVICE FOR A VEHICLE

(71) Applicants: Audi AG, Ingolstadt (DE); ThyssenKrupp Presta AG, Eschen (LI)

(72) Inventors: Sebastian Loos, Ingolstadt (DE); Daniel Kreutz, Feldkirch (AT); Arne Schacht, Feldkirch (AT)

(73) Assignees: AUDI AG, Ingolstadt (DE); THYSSENKRUPP PRESTA AG, Eschen (LI)

( * ) Notice: Subject to any disclaimer, the term of this patent is extended or adjusted under 35 U.S.C. 154(b) by 118 days.

(21) Appl. No.: 16/630,631

(22) PCT Filed: Jul. 11, 2018

(86) PCT No.: PCT/EP2018/068789
§ 371 (c)(1),
(2) Date: Jan. 13, 2020

(87) PCT Pub. No.: WO2019/011985
PCT Pub. Date: Jan. 17, 2019

(65) Prior Publication Data
US 2020/0148262 A1     May 14, 2020

(30) Foreign Application Priority Data

Jul. 13, 2017     (DE) .................. 10 2017 212 036.3

(51) Int. Cl.
*B62D 6/00*     (2006.01)
*B62D 15/00*    (2006.01)
(Continued)

(52) U.S. Cl.
CPC ......... *B62D 15/0265* (2013.01); *B60W 30/09* (2013.01); *B60T 2201/022* (2013.01);
(Continued)

(58) Field of Classification Search
CPC .... B62D 15/0265; B62D 6/002; B62D 6/008; B60W 30/09; B60W 10/20;
(Continued)

(56) References Cited

U.S. PATENT DOCUMENTS 6,323,763 B1 * 11/2001 Bohner ................... B62D 1/28
340/436
2012/0303217 A1 * 11/2012 Reichel ............. B62D 15/0265
701/41
(Continued)

FOREIGN PATENT DOCUMENTS

DE     10 2009 046 375 A1     5/2011
DE     10 2010 053 156 A1     6/2012
(Continued)

OTHER PUBLICATIONS

English Translation of International Preliminary Report on Patentability dated Jan. 14, 2020 in International Application No. PCT/EP2018/068789.
(Continued)

*Primary Examiner* — Jason Holloway
(74) *Attorney, Agent, or Firm* — Panitch Schwarze Belisario & Nadel LLP

(57) ABSTRACT

A steering apparatus for a two-track vehicle may include a steering handle, in the case of whose rotary actuation the steerable vehicle wheels can be turned by a wheel steering angle, and a control device to electrically actuate a steering actuator for setting the wheel steering angle was a function of driving operational parameters and independently of the steering handle and a clutch that provides a releasable mechanical steering connection between the steering handle and the steerable vehicle wheels. An automatic avoidance manoeuvre may be carried out in the case of a risk of collision, in which the control device fully releases the clutch, and the control device actuates the steering actuator
(Continued)

such that the vehicle briefly leaves its driving lane and is then brought back into the driving lane. The control device also actuates a braking of the steering handle during the collision avoidance manoeuvre.

9 Claims, 2 Drawing Sheets

(51) Int. Cl.
    *B60W 30/09*     (2012.01)
    *B62D 15/02*     (2006.01)
    *B60W 10/20*     (2006.01)

(52) U.S. Cl.
    CPC .......... *B60T 2201/08* (2013.01); *B60W 10/20* (2013.01); *B60W 2520/10* (2013.01); *B60W 2540/18* (2013.01); *B60W 2710/20* (2013.01); *B62D 6/002* (2013.01); *B62D 6/008* (2013.01)

(58) Field of Classification Search
    CPC ......... B60W 2520/10; B60W 2540/18; B60W 2710/20; B60T 2201/022; B60T 2201/08
    See application file for complete search history.

(56) References Cited

U.S. PATENT DOCUMENTS

| | | |
|---|---|---|
| 2012/0330509 A1 | 12/2012 | Kornhaas et al. |
| 2015/0217801 A1* | 8/2015 | Takeda .................. B62D 6/10 701/42 |
| 2018/0204463 A1* | 7/2018 | Khalifeh ............... B60W 50/10 |

FOREIGN PATENT DOCUMENTS

| | | |
|---|---|---|
| DE | 10 2014 018395 A1 | 6/2015 |
| DE | 10 2014 016 017 A1 | 5/2016 |
| DE | 10 2015 004745 A1 | 10/2016 |
| EP | 0970875 A2 | 1/2000 |
| EP | 2460712 A2 | 6/2012 |

OTHER PUBLICATIONS

Int'l Search Report and Written Opinion dated Oct. 22, 2018 in Int'l Application No. PCT/EP2018/068789, translation of Search Report only.

* cited by examiner

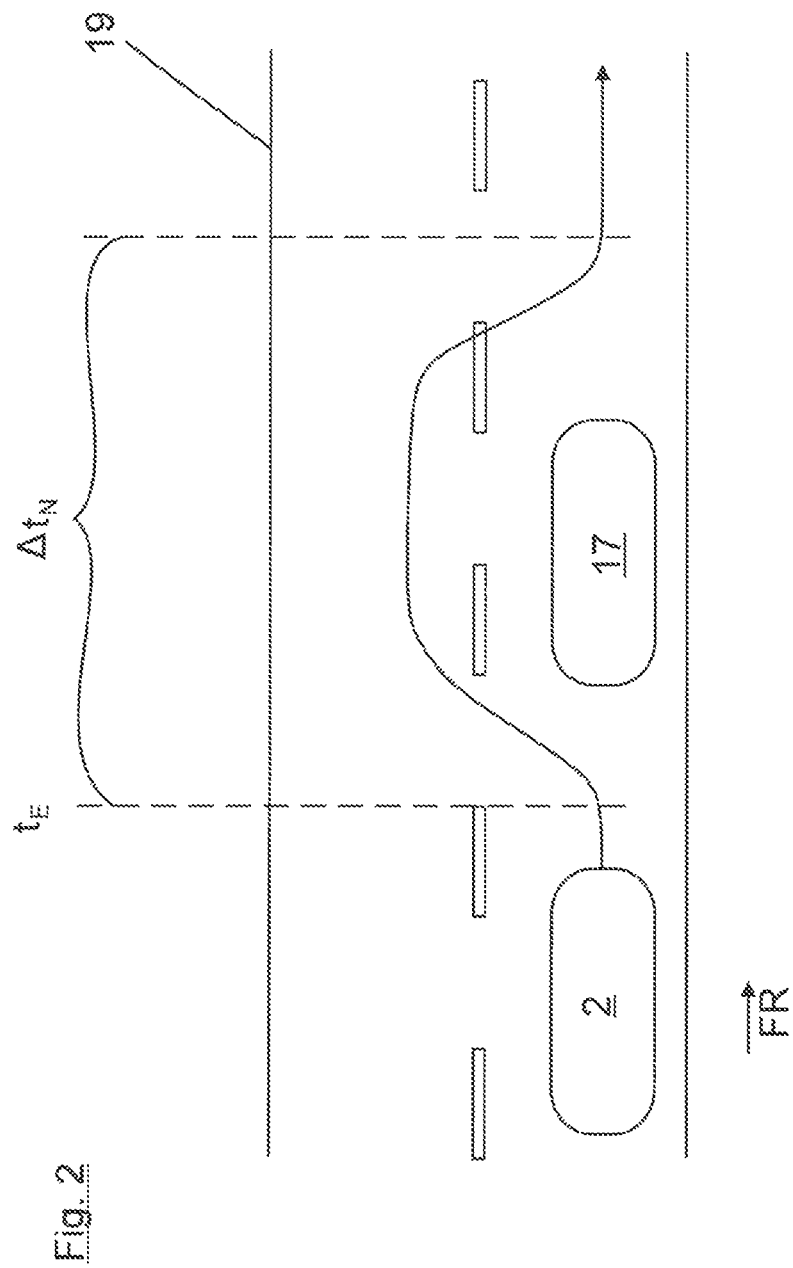

STEERING DEVICE FOR A VEHICLE

CROSS REFERENCE TO RELATED APPLICATIONS

This application is a Section 371 of International Application No. PCT/EP2018/068789, filed Jul. 11, 2018, which was published in the German language on Jan. 17, 2019, under International Publication No. WO 2019/011985 A1, which claims priority under to German Application No. 10 2017 212 036.3, filed Jul. 13, 2017, the disclosures of which are incorporated herein by reference in their entireties.

FIELD OF ENDEAVOR

The invention relates to a steering apparatus for a two-track vehicle.

BACKGROUND

Modern driver assistance systems enable the vehicle to perceive and to interpret its environment, identify dangerous situations and support the driver with their driving manoeuvres or carry out automatic driving manoeuvres in order to avoid vehicle collisions.

A generic steering apparatus for a two-track vehicle is known from DE 10 2009 046 375 A1. This steering apparatus has a steering handle, in the case of whose rotary actuation the steerable vehicle wheels can be turned from their straight-ahead position by a wheel steering angle. In addition, the steering apparatus has a control device by means of which a steering actuator for driver-independent setting of the wheel steering angle can be electrically actuated as a function of driving operational parameters and independently of the steering handle. When there is a risk of a collision, the electronic control device can carry out an automatic emergency avoidance manoeuvre, in the case of which the control device actuates the steering actuator such that the vehicle briefly leaves its driving lane and then optionally returns to its driving lane again in order to avoid for example a collision object. In the case of such an automatic emergency avoidance manoeuvre, the steering system must set large steering angles with high gradients in a highly-dynamic operation. Based on the mechanical connection between the steering wheel and the steerable vehicle wheels, the steering wheel is also rotated with a large angle of rotation and with high dynamics.

In order to uncouple the steering wheel from the steering system during the emergency avoidance manoeuvre, a clutch is interconnected in the mechanical connection between the steering handle and the vehicle wheels in DE 10 2009 046 375 A1 which is opened during the emergency avoidance manoeuvre.

Such uncoupling leads to the steering wheel being freely rotatable by the driver without effort which can lead to the driver being irritated and can also make closing the clutch more difficult after a successful emergency avoidance manoeuvre.

A vehicle steering apparatus with a steering wheel lock is known from DE 10 2014 016 017 A1 by means of which a steering wheel rotary actuation is locked or blocked and namely in the case of a fault or in the case of a parked vehicle. A method is known from DE 10 2010 053 156 A1 to operate a motor vehicle and a motor vehicle with an environmental detection device.

The object of the invention is to provide a steering apparatus for a vehicle, in the case of which an automatic avoidance manoeuvre can be carried out seamlessly and without irritation on the part of the driver.

BRIEF SUMMARY OF ASPECTS OF THE DISCLOSURE

The object may be achieved by the features as set forth in various ones of the accompanying claims.

The invention is based on the fact that in the above prior art the steering wheel is freely rotatable during an automatic emergency avoidance manoeuvre. In contrast to this, according to aspects of the present disclosure, a brake electrically actuatable by the control device is assigned to the steering handle. The control device can actuate the brake during the emergency avoidance manoeuvre such that the steering handle is fixed in its uncoupling rotary position at the uncoupling time and therefore remains stationary during the emergency avoidance manoeuvre. In this way, irritation to the driver can be avoided and a correctly-positioned re-coupling of the steering handle after a successful emergency avoidance manoeuvre is also simplified. According to the invention, the emergency avoidance system is therefore designed more comfortably and safer for the driver, with the steering conditions during the emergency avoidance manoeuvre not being perceived by the driver as disruptive.

As indicated above, the steering handle therefore remains in the uncoupling rotary position during the emergency avoidance manoeuvre at least in the case of non-rotary actuation by the driver. The brake is preferably actuated during the emergency avoidance manoeuvre by the control device such that a brake torque is generated with the help of which an active driver-side steering actuation of the steering handle from the uncoupling rotary position is completely blocked or is at least locked.

In order to achieve such a steering handle lock, the brake torque generated by the brake can be measured such that the driver can perform a manual rotary actuation of the steering handle from its uncoupling rotary position overcoming the brake torque. The brake torque generated by the brake is preferably changeable such that the driver can steer the steering handle. For example, the size of the brake torque generated by the brake may depend on the direction of rotation of the steering handle rotary actuation. Thus, the size of the brake torque, in the case of a steering handle rotary actuation carried out in a clockwise direction, may be different to the size of the brake torque, in the case of a steering handle rotary actuation carried out in the anti-clockwise direction.

With respect to a seamless process of the emergency avoidance manoeuvre, it is particularly preferred when, in the case of a steering handle rotary actuation carried out in a direction of rotation from the uncoupling rotary position (i.e. steered away), the brake torque generated by the brake is greater than the brake torque in the case of steering back, i.e. in the case of a steering handle rotary actuation carried out in the counter rotation direction back into the uncoupling rotary position.

In a preferred further development, the vehicle can also drive in an autonomous driving operation. Also in this case, the control device can completely release the clutch between the steering handle and the steerable vehicle wheels and actuate the brake such that the steering handle remains stationary during the autonomous driving operation. It is therefore carried out independently of the driver solely by the control device and the steering actuator actuated thereby.

BRIEF DESCRIPTION OF THE DRAWINGS

An exemplary embodiment of the invention is described below using the enclosed figures. In the drawings:

FIG. 2 shows a view which illustrates an emergency avoidance manoeuvre of the vehicle.

DETAILED DESCRIPTION OF ASPECTS OF THE DISCLOSURE

Figure 1:
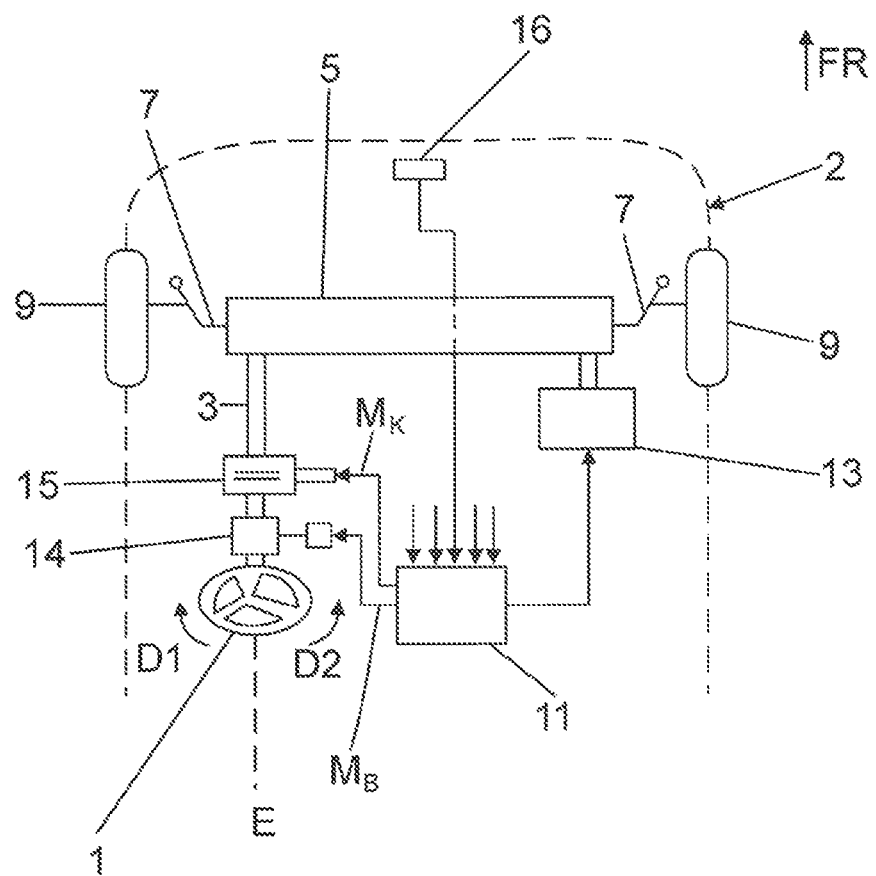
FIG. 1 shows, in a roughly schematic partial view, the front car region of a two-track motor vehicle with indicated steering apparatus.

In FIG. 1, a steering apparatus for a two-track vehicle is shown roughly schematically which has a steering handle 1, which is in operational (i.e. mechanical) connection with a toothed rack (not shown) arranged in a steering gear 5 via a multi-part steering column 3. It is aligned in the vehicle transverse direction y and can be set by a rotary actuation of the steering handle 1 in the vehicle transverse direction y. The toothed rack arranged in the steering gear 5 is extended on both sides with track rods 7 which are deflected on wheel supports, not represented, of the two steerable front wheels 9. In the case of a rotary actuation of the steering handle 1, the front wheels 9 are therefore turned by a wheel steering angle correlating thereto.

The steering apparatus shown in FIG. 1 also has a control device 11 by means of which a driver-independent wheel steering angle can be generated in certain driving situations. To this end, the control device 11 is, on the output side, in signal connection with a steering actuator 13, with a clutch 15 and with a brake 14, with which a brake torque can be generated in order to lock a rotary actuation of the steering handle 1. The control device 11 is, on the input side, amongst other things, connected to an environmental sensor 17, by means of which in the driving operation for example a potential collision object 17 (FIG. 2) can be detected in the environment of the motor vehicle. In the case of detecting such an object 17, it is evaluated in the control device 11 based on the sensor data whether there is a risk of collision. In the case of there being such a risk of collision, the control device 11 can optionally carry out an automatic emergency avoidance manoeuvre AN (FIG. 2) in order to avoid the collision object 17. Such an emergency avoidance manoeuvre $\Delta t_N$ is a highly-dynamic operation which lasts for example 0.5 to 1 s.

In order to generate the above-mentioned driver-independent wheel steering angle, the control device 11 can actuate the steering actuator 13 as a function of driving operational parameters (e.g. vehicle speed, vehicle transverse acceleration, etc.) and independently of the steering handle 1, said steering actuator being in operational connection with the toothed rack of the steering gear 5 in order to set the wheel steering angle of the front wheels 9 independently of the driver. In this case, the clutch 15 interconnected in the multi-part steering column 3 is fully opened in order to release a mechanical steering connection between the steering handle 1 and the two front wheels 9.

In normal driving operation, a clutch torque $M_K$ is generated in the clutch 15 in order to ensure a mechanical steering connection and driver-dependent steering. In addition, the steering actuator 13, during normal driving operation, acts as a servo unit for steering handle support.

A driving situation is described below using FIG. 2, in which the vehicle 1 in the driving direction FR driving straight ahead on a driving lane 19 approximates a stationary potential collision object 17. In this case, the collision object 17 is detected by the environmental sensor 16 of the vehicle 2 which sends corresponding sensor data to the control device 11. If the presence of a risk of collision is determined, the control device 11 carries out an automatic emergency avoidance manoeuvre $\Delta t_N$, in the case of which firstly at an uncoupling time $t_E$ the control device 11 fully releases the clutch 15 between the steering handle 1 and the steerable vehicle wheels 9. In addition, the control device 11 actuates the steering actuator 13 such that the vehicle 2 briefly leaves its driving lane, avoids the collision object 17 and optionally then returns back to its driving lane. As soon as the vehicle 2 is brought back into its driving lane, the automatic emergency avoidance manoeuvre ends $\Delta t_N$. At this time, the emergency avoidance intervention of the steering actuator 13 ends and the clutch 15 is closed again in order to enable a driver-side steering intervention.

During the emergency avoidance manoeuvre $\Delta t_N$, the brake 14 is activated by the control device 11 such that the steering handle 1 remains stationary in its rotary position E (below uncoupling rotary position) at the uncoupling time $t_E$. The uncoupling rotary position E of the steering handle 1 corresponds in FIGS. 1 and 2 to an unturned front wheel position when driving straight ahead. The brake 14 generates a brake torque $M_B$ for the steering handle lock which counteracts a steering actuation carried out by the driver. The brake torque $M_B$ generated by the brake 14 is measured such that the driver can perform a manual rotary actuation of the steering handle 1 from the uncoupling rotary position E overcoming the brake torque $M_B$.

However, in the case of such steering actuation carried out by the driver during the emergency avoidance manoeuvre $\Delta t_N$, the applied brake torque $M_B$ is not constant, but rather the size of the brake torque $M_B$ in fact depends on the direction of rotation of the driver-side steering handle rotary actuation: Thus, in the case of steering away (e.g. in a clockwise direction D1) from the uncoupling rotary position E, the brake torque $M_B$ generated by the brake 14 is greater than the brake torque $M_B$ in the case of steering back (in the anti-clockwise direction D2) back into the uncoupling rotary position E. In this way, the driver receives haptic feedback which supports a rotary actuation of the steering handle 1 in the direction of the uncoupling rotary position E. As a result, it is ensured at the time of ending the emergency avoidance manoeuvre $\Delta t_N$ that the steering handle 1 is located correctly positioned in its straight-ahead position and the clutch 15 can be seamlessly closed again.

What is claimed is:

1. A steering apparatus for a two-track vehicle, including:
   a steering handle, with rotary actuation of which steerable vehicle wheels of the vehicle are enabled to be turned by a wheel steering angle;
   a steering actuator arranged to set the wheel steering angle;
   a control device enabled to electrically actuate the steering actuator to set the wheel steering angle as a function of driving operational parameters and independently of the steering handle;
   a clutch that is electrically actuatable via the control device, with which a mechanical steering connection between the steering handle and the steerable vehicle wheels is enabled to be coupled or released; and
   a steering handle brake that is electrically actuable by the control device,
   wherein the control device is configured to carry out an automatic avoidance manoeuvre in the case of there being a risk of collision, wherein, at an uncoupling time, the control device controls the clutch to fully release the mechanical connection between the steering handle and the steerable vehicle wheels and actuates the steering actuator such that the vehicle leaves a present driving lane and is then brought back into the driving lane again, and wherein the control device actuates the brake during the emergency avoidance manoeuvre such that the steering handle remains stationary in a rotary position at the uncoupling time during the emergency avoidance manoeuvre.

2. The steering apparatus according to claim 1, wherein a steering actuation of the steering handle during the emergency avoidance manoeuvre from the rotary position at the uncoupling time is blocked or locked by means of a brake torque generated by the brake.

3. The steering apparatus according to claim 1, wherein brake torque generated by the brake is measured such that the driver is able to perform a manual rotary actuation of the steering handle from a rotary position at the uncoupling time, overcoming the brake torque.

4. The steering apparatus according to claim 3, wherein a size of the brake torque generated by the brake depends on a direction of rotation of the steering handle rotary actuation.

5. The steering apparatus according to claim 4, wherein in the case of a steering handle rotary actuation carried out in a first direction of rotation from the rotary position at the uncoupling time, the brake torque generated by the brake is greater than the brake torque generated by the brake in the case of a steering handle rotary actuation carried out in a second rotation direction back into the rotary position at the uncoupling time.

6. The steering apparatus according to claim 1, wherein the vehicle is an autonomously driving vehicle, and wherein, in an autonomous driving operation, the control device controls the clutch to fully release the mechanical connection between the steering handle and the steerable vehicle wheels and actuates the brake such that the steering handle remains stationary, while the vehicle steering takes place automatically, independently of the driver, with the aid of the control device.

7. A method of operating a vehicle that incorporates the steering apparatus according to claim 1, the method including:
   carrying out an automatic collision avoidance procedure, the collision avoidance procedure comprising:
   controlling the clutch to fully release the mechanical connection between the steering handle and the steerable vehicle wheels at an uncoupling time;
   actuating the steering actuator such that the vehicle leaves a present driving lane and then is brought back into the driving lane; and
   actuating the brake such that the steering handle remains stationary in a rotary position at the uncoupling time during the automatic collision avoidance procedure
   wherein the controlling the clutch, the actuating the steering actuator, and the actuating the brake are performed by the control device of the steering apparatus.

8. The method according to claim 7, wherein the collision avoidance procedure further includes actuating the steering actuator by the control device of the steering apparatus to bring the vehicle back into the driving lane after the vehicle leaves the driving lane.

9. The steering apparatus according to claim 1, wherein the control device further actuates the steering actuator to bring the vehicle back into the driving lane after the vehicle leaves the driving lane during the automatic avoidance manoeuvre.

* * * * *